United States Patent [19]
Shinjo et al.

[11] Patent Number: 5,538,695
[45] Date of Patent: Jul. 23, 1996

[54] OZONIZER

[75] Inventors: Ryoichi Shinjo, Kanagawa-ken; Ichiro Kamiya, Tokyo; Minoru Harada; Yukiko Nishioka, both of Kanagawa-ken, all of Japan

[73] Assignee: Ebara Corporation, Tokyo, Japan

[21] Appl. No.: 85,152

[22] Filed: Jul. 2, 1993

[30] Foreign Application Priority Data

Jul. 3, 1992 [JP] Japan .................. 4-199006

[51] Int. Cl.⁶ .................. B01J 19/12
[52] U.S. Cl. .................. 422/186.07; 422/186.11
[58] Field of Search .................. 422/186.07, 186.11

[56] References Cited

U.S. PATENT DOCUMENTS 3,616,382  10/1971  Bartle et al. .................. 422/186.07

FOREIGN PATENT DOCUMENTS

| 160964  | 11/1985 | European Pat. Off. . |
| 253131  | 1/1988  | European Pat. Off. . |
| 1-282104 | 11/1989 | Japan . |
| 1-298003 | 12/1989 | Japan . |
| 9007466 | 7/1990  | WIPO . |

OTHER PUBLICATIONS

Dimitriou, M. A., "Design Guidance Manual for Ozone Systems", Int'l Ozone Assn., 1990, pp. 3–12.

Primary Examiner—Charles T. Jordan
Assistant Examiner—Daniel Jenkins
Attorney, Agent, or Firm—Armstrong, Westerman, Hattori, McLeland & Naughton

[57] ABSTRACT

In an electric discharge type ozonizer using highly pure oxygen gas having a purity of not lower than 99.99% as a raw material gas, the pressure of a gas in the discharge space of a discharger is raised to a level higher than atmospheric pressure by at least 1.1 $kgf/cm^2$, and/or in which a liquid-cooled discharger is used, and the temperature of the cooling liquid is set at a level not lower than 15° C., whereby the ozonizer is capable of stably producing ozone gas at a high ozone concentration without causing lowering of the ozone concentration with time.

8 Claims, 4 Drawing Sheets

OZONIZER

BACKGROUND OF THE INVENTION

1. Field of the Art

The present invention relates to an electric discharge type ozonizer.

2. Prior Art

Electric discharge type ozonizers having a basic structure as shown in FIGS. 3 to 7 have been put to practical use or proposed. In FIGS. 3 to 7, reference numeral 13 denotes a high-voltage electrode, 14 a grounding electrode, 15 a dielectric, 16 a discharge space, and 17 a high-voltage AC power supply.

FIG. 3 shows an ozonizer having a glass tube as a dielectric 15 and cylindrical electrodes 13 and 14. FIGS. 4 and 5 show ozonizers having a flat plate type dielectric 15 and electrodes 13 and 14. In the ozonizer shown in FIG. 4, a dielectric plate 15 is installed at one side of the electrodes only, whereas, in the ozonizer shown in FIG. 5, a dielectric plate 15 is installed at each side of the electrodes. FIG. 6 shows an ozonizer having serrated projections provided on the high-voltage electrode 13 in order to raise the electric discharge density. FIG. 7 shows a creeping discharge type ozonizer, wherein electric discharge is effected in a discharge space 16 formed between the both ends of the high-voltage electrode 13 and the upper surface of the dielectric 15. It is apparent that any of these ozonizers can be used even if the high-voltage side and the ground side are connected in reverse manner to the above.

Recently, ozone use has been rapidly expanding in the semiconductor manufacturing industry because of its noteworthy advantages; that is, its strong oxidizing action, decomposing action, catalytic action and its cleanliness. Ozonizers used in the semiconductor manufacturing process are required to produce high concentration of ozone and to minimize the content of contaminants in a gas containing ozone produced. Accordingly, oxygen gas, which is used as a raw material gas in electric discharge type ozonizers is also desired to be highly pure, having a purity not lower than 99.99%.

However, if oxygen of such high purity is used as a raw material gas in an electric discharge type ozonizer, the ozone concentration in the ozone containing gas produced decreases with time. Therefore, ozone gas having a high concentration cannot stably be obtained. The ozone concentration lowering phenomenon is peculiar to high-purity oxygen gas, and it does not occur with oxygen gas of about 99.5% purity. The decrease in ozone concentration with time is a phenomenon common to all electric discharge type ozonizers, which vary in structure, as described above, although there are some differences in the rate of decrease in ozone concentration.

In order to prevent a decrease in ozone concentration with time when ozone is generated by passing high-purity oxygen gas through an electric discharge type ozonizer, as described above, a method has been proposed in which an additive gas, e.g., nitrogen, argon, helium, carbon dioxide, etc., is mixed with high-purity oxygen gas used as a raw material gas.

More specifically, Japanese Patent Application Public Disclosure (KOKAI) No. 1-298003, for example, proposes a method wherein nitrogen gas of high purity is mixed with high-purity oxygen gas used as a raw material gas to produce ozone, which is used in a semiconductor device manufacturing process or other similar process, so as to prevent a decrease in ozone concentration with time in the formation of ozone by passing high-purity oxygen gas through an ozonizer, particularly an ozonizer having an electrode formed at the surface thereof with a dielectric comprising a glaze coat layer and a coating of alumina, quartz or the like, which is widely used in the process of manufacturing semiconductor devices. It should be noted that the specification of this publication mentions that when argon or helium of high purity is mixed with high-purity oxygen gas, it is impossible to effectively prevent a decrease in ozone concentration with time such as is attained when high-purity nitrogen gas is used.

Japanese Patent Application Public Disclosure (KOKAI) No. 3-218905 proposes a method wherein 0.02% to 2% nitrogen gas is mixed with high-purity oxygen gas which is to be passed through an ozonizer to produce ozone gas having a high ozone concentration used to form an insulating film on a semiconductor wafer.

Japanese Patent Application Public Disclosure (KOKAI) No. 1-282104 proposes a method wherein 1.0 vol % to 10.0 vol % an inert gas, e.g., nitrogen, argon, helium, carbon dioxide gas, etc., is mixed with high-purity oxygen gas which is to be passed through an ozonizer to obtain ozone gas used for the purpose of ashing organic contamination and a photoresist which are present on a silicon wafer as measures to prevent a decrease in ozone concentration with time.

However, if highly pure oxygen gas is mixed with another kind of gas for the purpose of preventing a decrease in an ozone concentration with time as in the above-described various cases, the additive gas mingles with the ozone gas produced, which produces an adverse effect on the semiconductor manufacturing process for which the ozone gas is used.

In addition, it is necessary to prepare a gas cylinder filled with a mixed gas as a raw material gas or to provide a means of mixing together highly pure oxygen gas and an additive gas, which make the ozonizer costly.

Particularly, when nitrogen is used as an additive gas, $NO_x$ gas (various kinds of nitrogen oxide gas), which is generated by electric discharge, is injected directly into the semiconductor manufacturing process, producing an adverse effect thereon.

SUMMARY OF THE INVENTION

It is, therefore, an object of the present invention to solve the above-described drawbacks of the prior art and to provide an electric discharge type ozonizer which is capable of stably producing ozone gas at a high concentration without any decrease in the ozone concentration with time by using only highly pure oxygen gas.

The above-described problems are solved by the ozonizer of the present invention.

That is, the present invention provides an electric discharge type ozonizer that uses highly pure oxygen gas having a purity of not lower than 99.99% as a raw material gas, wherein (1) the pressure of a gas in a discharge space of a discharger of the ozonizer is raised to a level higher than atmospheric pressure by at least 1.1 kgf/cm$^2$.

Alternately, (2) the ozonizer includes a liquid-cooled discharger, and the temperature of the cooling liquid is not lower than 15° C.

It is preferable for the pressure of the gas in the discharge space of the discharger to be maintained at a constant level and that the temperature of the cooling liquid should also be maintained at a constant level.

The ozonizer of the present invention may be arranged such that the pressure in the discharger is set at a level not lower than 1.1 kgf/cm$^2$ in terms of gauge pressure and, at the same time, the temperature of the liquid for cooling the discharger is set at a level not lower than 15° C.

The discharger of the ozonizer according to the present invention is preferably constructed such that one of a pair of electrodes facing each other across a dielectric has a plurality of serration-shaped projections provided on a surface thereof facing the dielectric, so that the distal ends of the projections are in contact with or in close proximity to the dielectric to form a tunnel-shaped space between the dielectric and the recesses formed between the projections. In the tunnel-shaped space, a raw material gas and a product gas pass, and an electric discharge occurs.

In the present invention, the term "highly pure oxygen" means oxygen having a purity not lower than 99.99%.

It has heretofore been considered that when oxygen having a purity of 99.54% is used in an electric discharge type ozonizer, the concentration of ozone gas produced becomes higher as the temperature of the discharger decreases.

In the ozonizer of the present invention also, when industrial oxygen having a purity of 99.5% was used as a raw material gas, similar results were obtained. That is, the lower the cooling temperature, the higher the ozone concentration, and the more stable the ozone concentration over time. However, when highly pure oxygen was used as a raw material gas, the concentration of the ozone gas produced became more stable over time as the cooling temperature rose.

When the temperature of a liquid for cooling the discharger was set at a relatively low level, i.e., 4° C, and the pressure in the discharger was set at 1.1 kgf/cm$^2$ (gauge pressure), the concentration of the ozone gas produced stabilized at a high concentration of not lower than 100 mg/Nl. although it slightly decreased at the beginning in a similar manner as in the case of the raised cooling liquid temperature.

In conventional electric discharge type ozonizers, the pressure in a discharger usually ranges from atmospheric pressure to a low pressure of about 0.5 kgf/cm$^2$ (gauge pressure). The reason for this is considered to be as follows: At a low pressure, the electrical impedance of the gas is small. Therefore, the electric current in the discharge space increases, and the rate of production of ozone also increases. However, with regard to the stability to the lowering of the ozone concentration with time when highly pure oxygen was used as a raw material gas, it was revealed as a result of our experimentation that the ozone concentration was more stable at a higher pressure.

In the ozonizer of the present invention, the pressure in the discharger can be raised to 3.0 kgf/cm$^2$ (gauge pressure). If the strength of the discharger is enhanced, it is possible to produce an ozonizer which can endure a higher pressure. In such a case, however, the ozonizer would increase in size and cost, which is impractical.

The rise in the temperature of a liquid for cooling the discharger is not limited until the cooling liquid vaporizes. In actual practice, a higher concentration of ozone can be stably produced by using highly pure oxygen of 99.99% with the cooling liquid temperature being maintained at 40° C. However, with the cooling liquid temperature set at 20° C., a high concentration of ozone, i.e., 200 mg/Nl., can be stably produced by using high-purity oxygen of 99.99% purity. Therefore, a cooling liquid temperature of 20° C. suffices for practical use.

The present inventors are the first to discover that in an electric discharge type ozonizer ozone gas having a higher ozone concentration is obtained more stably with regard to the passage of time at a higher temperature of liquid for cooling the discharger, and that as to the pressure in the discharger also, as the pressure rises, ozone gas having a higher ozone concentration is obtained more stably with regard to the passage of time. The above-described finding, which is a surprising phenomenon, was not known in the past but obtained only as a result of our research in which ozone gas was produced by using high-purity oxygen as a raw material gas. The reason why such a phenomenon occurs when ozone gas is produced by using high-purity oxygen as a raw material is not clear.

In order to cause an electric discharge in an electric discharge type ozonizer by increasing the pressure in the discharger or by raising the temperature of the liquid for cooling the discharger, the discharger of the ozonizer must be constructed so as to be conformable to these conditions.

With the ozonizer of the present invention, it is possible to stably produce high concentrations of ozone, i.e., 100 mg/Nl. or higher, by using highly pure oxygen of 99.99% purity if tile pressure in the discharge space of the discharger is set higher than 1.1 kgf/cm$^2$ or the cooling temperature is set to be not lower than 15° C., as described above.

If ozone is generated by a conventional ozonizer using highly pure oxygen of 99.995% under the conditions that the pressure in the discharge space is 0.5 kgf/cm$^2$ and the cooling temperature is 4° C., even if a high concentration of ozone, i.e., 100 mg/Nl., is obtained at the beginning of the operation, the ozone concentration decreases with time. According to the above-mentioned prior art, the formation of ozone gas having a high ozone concentration can be maintained if about 0.5% highly pure nitrogen gas is added, but it cannot be maintained when helium gas is added in an amount equal to the above. However, if the pressure in the discharge space is set at 1.1 kgf/cm$^2$ in accordance with the present invention, the formation of ozone gas having a high ozone concentration can be maintained, without the addition of any other gases.

When the purity of oxygen used as a raw material gas is lowered to 99.0% by addition of helium gas, and the pressure in the discharge space is kept at 1.1 kgf/cm$^2$, the ozone concentration can be maintained at a constant level regardless of the passage of time although the ozone concentration becomes lower than the above-described level, i.e., 100 mg/Nl.

This fact shows that, although in the present invention the purity of oxygen used as a raw material gas is limited to not lower than 99.99%, the use of oxygen having a purity made lower than the limit purity by addition of a completely inert gas, e.g., helium gas, could cause a phenomenon similar to that caused in the present invention.

Incidentally, impurities contained in oxygen used as a raw material gas in the present invention may consist of components contained in the average atmosphere, but the composition of the impurity components is variable.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

Example 1

One embodiment of the present invention will be described below with reference to FIGS. 1 and 2.

Figure 1:
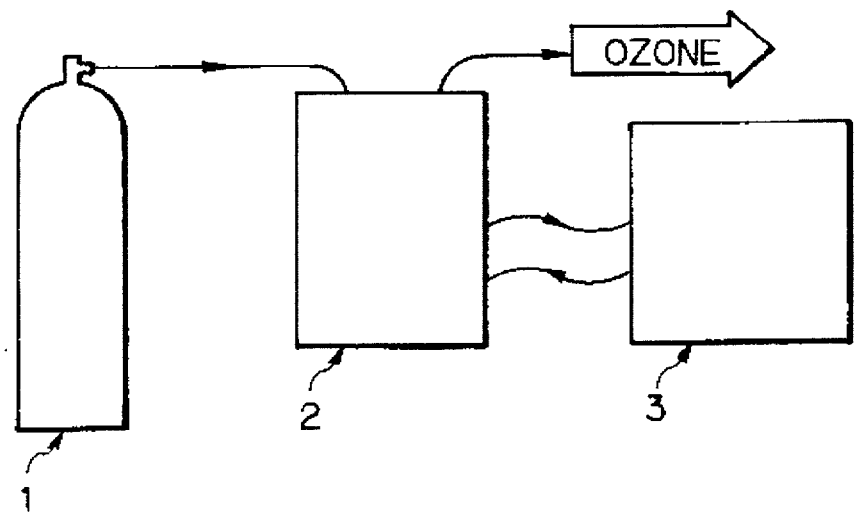
FIG. 1 schematically shows the arrangement of the electric discharge type ozonizer according to the present invention.

FIG. 1 shows an ozonizer 2 of the present invention in which while being cooled by a coolant supply device 3, electrodes provided in a discharger of the ozonizer 2 are supplied with energy from an AC power supply and high-purity oxygen from a gas cylinder 1, thereby producing ozone gas.

Figure 2:
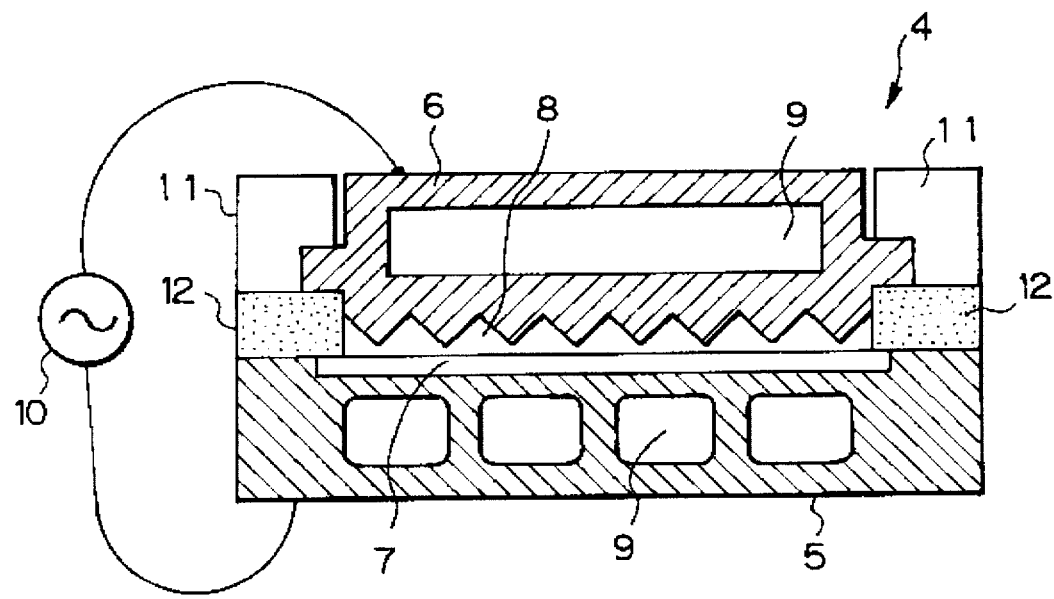
FIG. 2 is a sectional view showing a one example of discharger of the electric discharge type ozonizer according to the present invention.
Figure 3:
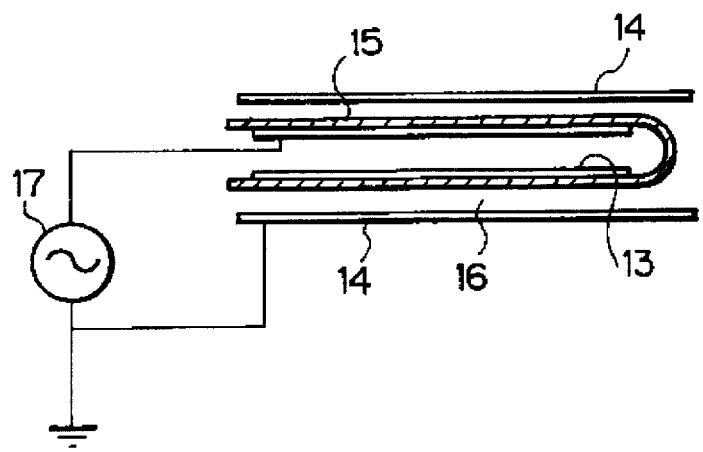
FIG. 3 is a sectional view showing a discharger of a conventional glass tube electric discharge type ozonizer.
Figure 4:
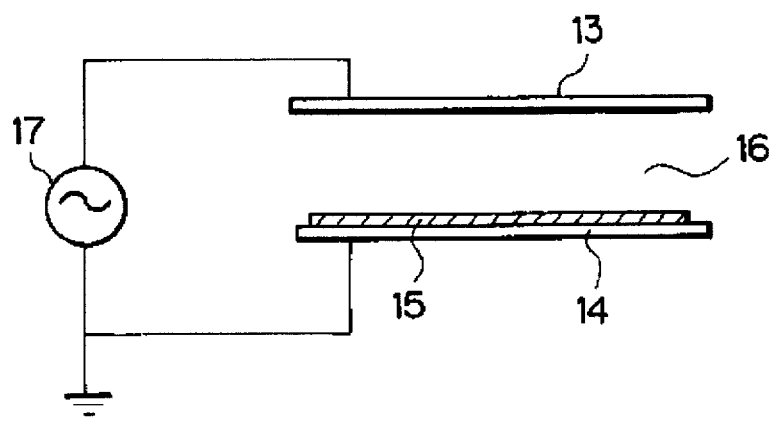
FIG. 4 is a sectional view showing a discharger of a conventional electric discharge type ozonizer having a flat plate structure in which a dielectric plate is provided only at one side.
Figure 5:
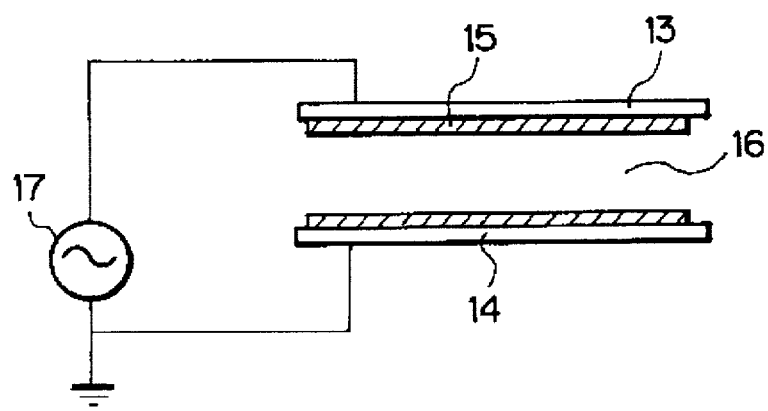
FIG. 5 is a sectional view showing a discharger of a conventional electric discharge type ozonizer having a flat plate structure in which a dielectric plate is provided at each side.
Figure 6:
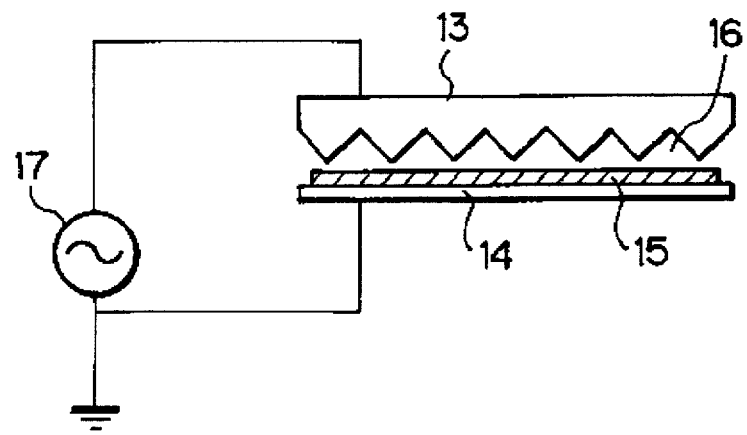
FIG. 6 is a sectional view of a discharger of a conventional electric discharge type ozonizer including an electrode provided with serrated projections.
Figure 7:
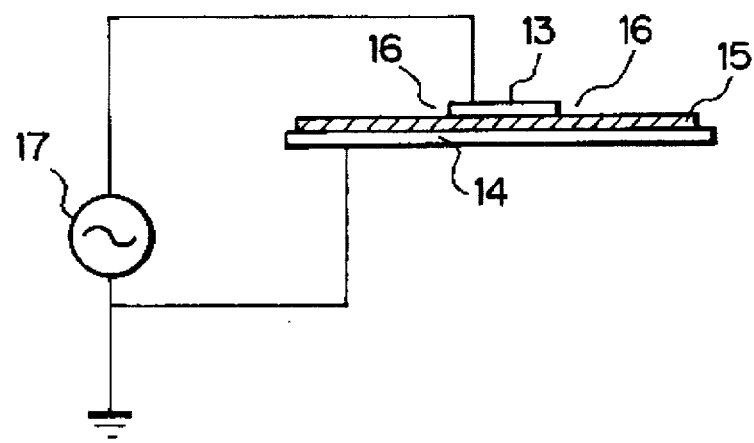
FIG. 7 is a sectional view of a discharger of a conventional creeping discharge type ozonizer.

In this Example 1, the discharger 4 that is installed in the ozonizer 2 is the one that is shown in FIG. 2.

Referring to FIG. 2, the discharger 4 has an electrode 5 and a counter electrode 6 having serrated projections, which are provided to face each other across a dielectric plate 7. The electrodes 5 and 6 are secured by an electrode retaining frame 11 with a spacer 12 interposed therebetween so as to maintain an appropriate discharge space 8 serving also as a gas flow path.

An alternating voltage is applied between the electrodes 5 and 6 in the discharger 4 from an AC power supply 10, and high-purity oxygen is supplied to the discharge space 8 from the gas cylinder 1, thereby producing ozone.

When the ozonizer 2 was operated by using the discharger 4 shown in FIG. 2 and oxygen of 99.5% purity as a raw material gas and setting the pressure in the discharger 4 at atmospheric pressure and the discharger cooling water temperature at 4° C., ozone gas having a ultrahigh ozone concentration, i.e., 200 mg/Nl. or higher, was obtained at a flow rate of 1 Nl./min. However, the ozone gas thus produced cannot be used for processing a semiconductor product because oxygen of 99.5% purity may produce an adverse effect on the semiconductor product due to impurities contained therein.

Figure 8:
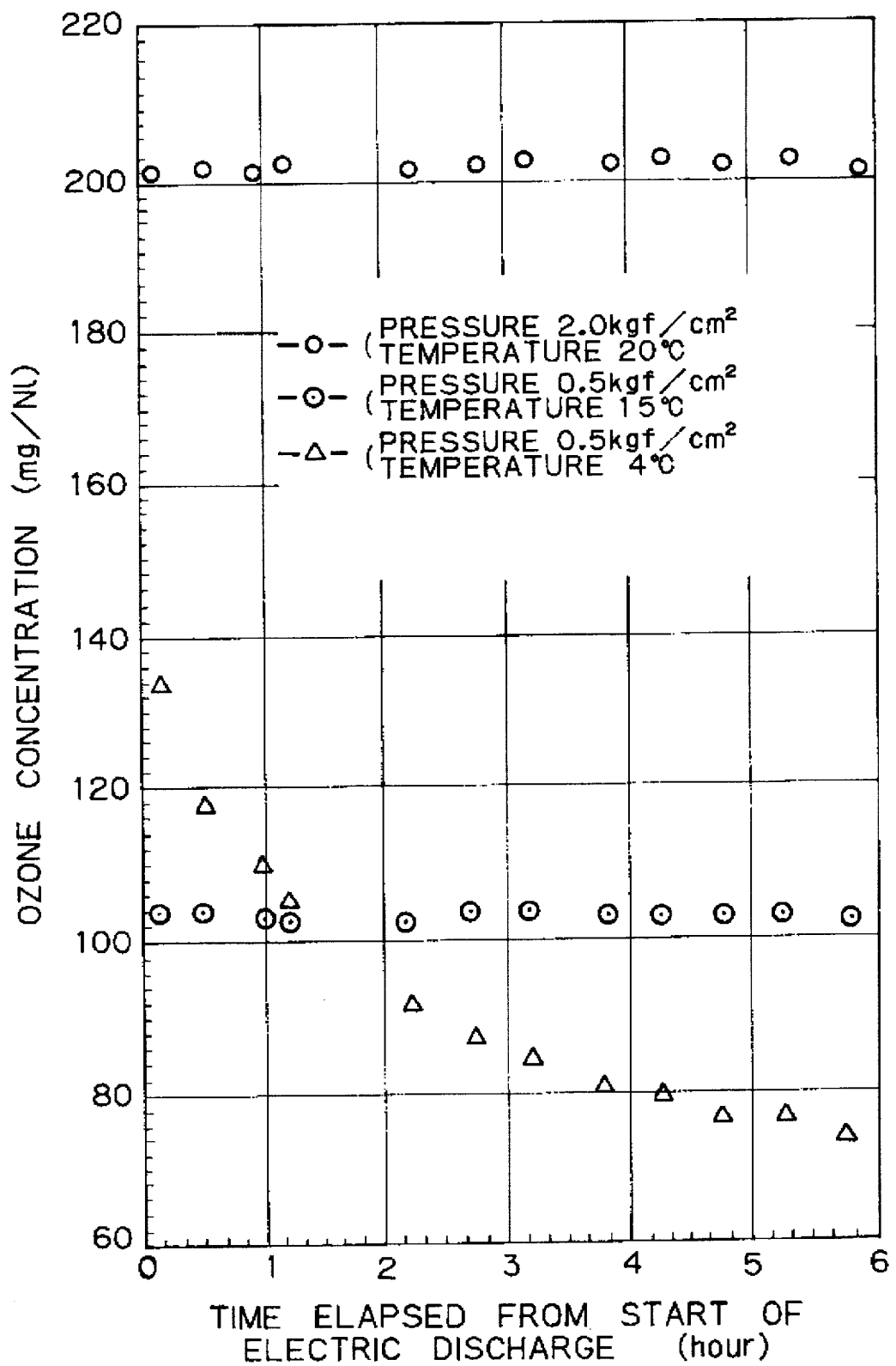
FIG. 8 is a graph showing the change with time of the concentration of ozone gas produced by an electric discharge type ozonizer according to the invention.

Next, when the pressure in the discharger was set at 0.5 kgf/cm² (gauge pressure) and the ozonizer 2 was operated using high-purity oxygen of 99.995% purity as a raw material gas with the other conditions left unchanged, the concentration of the ozone gas produced lowered with time, and no stable high ozone concentration was obtained, as shown in FIG. 8.

In contrast, when only the cooling water temperature was changed to 15° C. with other conditions being left unchanged, the concentration of the ozone gas produced stabilized at a high level of not lower than 100 mg/Nl, although it slightly lowered at the beginning (see FIG. 8).

It should be noted that although in this example water was used as a heat transfer medium, the same advantageous effect was also obtained when a substance other than water was used as a heat transfer medium.

Example 2

Next, the ozonizer 2 was operated under the same conditions as in Example 1 except that the cooling water temperature was returned to 4° C. and the pressure in the discharger was set at 1.1 kgf/cm² (gauge pressure). As a result, the concentration of the ozone gas produced stabilized at a high level of not lower than 100 mg/Nl, although it slightly lowered at the beginning in the same way as in the case of the raised cooling water temperature.

Example 3

When the cooling water temperature was raised to 20° C. and the pressure in the discharger was set to 2.0 kgf/cm² (gauge pressure), the concentration of the ozone gas produced stabilized at a high level of not lower than 200 mg/Nl. from the first, and there was no lowering of the ozone concentration with time (see FIG. 8).

From the results of these examples, it can be said that ozone gas at a high ozone concentration can be stably produced without causing any decrease in ozone concentration over time when the pressure of a gas in a discharge space of a discharger is raised to a level higher than atmospheric pressure by at least 1.1 kgf/cm² or when the ozonizer includes a liquid cooled discharger and the temperature of the cooling liquid is not lower than 15° C.

Thus, the present invention enables the ozone gas concentration to be stabilized at a high level when highly pure oxygen is used as a raw material gas by an extremely simple and easy method in which the cooling liquid temperature and/or the pressure in the discharger are raised, and it also enables ozone gas of high purity to be supplied to a semiconductor manufacturing process. Accordingly, it becomes unnecessary to prepare a mixed gas or to provide a gas mixing device. In addition, it becomes possible to prevent injection of an additive gas, e.g., $N_2$, $CO_2$, etc., which may have an adverse effect on the semiconductor manufacturing process, and a gas produced as a by-product from such an additive gas. Thus, the present invention provides great advantages.

It should be noted that in the semiconductor manufacturing process, high-purity oxygen used as a raw material gas in an ozonizer may be mixed with another kind of gas for a purpose other than stabilization of the ozone gas concentration. In such a case also, the ozonizer of the present invention can effectively be used, as a matter of course.

Further, although the embodiment was explained referring to a specific construction of a discharger, it is apparent that a discharger having another suitable construction may be used in the ozonizer of this invention.

What is claimed is:

1. An electric discharge type ozonizer using highly pure oxygen gas having a purity of not lower than 99.99% as a raw material gas, wherein the pressure of a gas in a discharge space of a discharger of said ozonizer is raised to a level higher than atmospheric pressure by at least 1.1 kgf/cm².

2. An ozonizer according to claim 1, wherein the pressure of the gas in the discharge space of said discharger is controlled so as to be constant at a level higher than atmospheric pressure by at least 1.1 kgf/².

3. An electric discharge type ozonizer using highly pure oxygen gas having a purity of not lower than 99.99% as a raw material gas, comprising a liquid-cooled discharger, wherein the temperature of the cooling liquid is not lower than 15° C.

4. An ozonizer according to claim 3, wherein the temperature of said cooling liquid is controlled so as to be constant at a level not lower than 15° C.

5. An electric discharge type ozonizer using highly pure oxygen gas having a purity of not lower than 99.99% as a raw material gas, comprising a liquid-cooled discharger, wherein the temperature of the cooling liquid is not lower than 15° C., and wherein the pressure of a gas in a discharge space of said discharger is raised to a level higher than atmospheric pressure by at least 1.1 kgf/cm².

6. An ozonizer according to claim 5, wherein the temperature of the cooling liquid is controlled so as to be constant at a level not lower than 15° C., and wherein the pressure of the gas in the discharge space of said discharger is controlled so as to be constant at a level higher than atmospheric pressure by at least 1.1 kgf/cm².

7. An electric discharge type ozonizer using highly pure oxygen gas having a purity of not lower than 99.99% as a raw material gas, comprising a liquid-cooled discharger, wherein the temperature of the cooling liquid is not lower than 15° C., and the pressure of a gas in a discharge space of said discharger is raised to a level higher than atmospheric pressure by at least 1.1 kgf/cm², said discharger having a structure in which one of a pair of electrodes facing each other across a dielectric has a plurality of serration-shaped projections provided on a surface thereof which faces said dielectric so that distal ends of said projections are in contact with or in close proximity to said dielectric to form a tunnel-shaped space between said dielectric and recesses formed between said projections, which is used as a raw material gas and product gas flow path serving also as a discharge space.

8. An ozonizer according to claim 7, wherein the temperature of the cooling liquid is controlled so as to be constant at a level not lower than 15° C., and wherein the pressure of the gas in the discharge space of said discharger is controlled so as to be constant at a level higher than atmospheric pressure by at least 1.1 kgf/cm².

* * * * *